Patented Apr. 15, 1947

2,418,847

UNITED STATES PATENT OFFICE 2,418,847

OAT PUDDING COMPOSITION

Sidney Musher, New York, N. Y., assignor to Musher Foundation Incorporated, New York, N. Y., a corporation of New York No Drawing. Application April 19, 1945, Serial No. 589,262

20 Claims. (Cl. 99—139)

The present invention relates to an oat flour pudding and its method of preparation, and more particularly to a composition useful for the preparation of an oat flour pudding which is free of gummy characteristics, shown a clean cut or break as when picked up with a spoon, and is completely devoid of the gumlike characteristics of oat flour and oat flour compositions.

Puddings using starches of various description, such as corn starch, potato starch, tapioca starch, sago starch, etc., as well as other cereal flours, such as corn flour, wheat flour and rye flour have long been successfully produced and present no difficulties in their preparation. However, up to the present invention attempts to produce a satisfactory oat flour pudding have met with failure. Such oat flour puddings as were proposed were gummy, had an unpleasant feel in the mouth, were tacky, stuck to the spoon, failed to give a clean cut, and pulled out into strings when picked up. These characteristics which made the proposed oat flour puddings a failure were imparted to the pudding by the oat flour itself, since oat flour becomes gummy when warmed or heated in liquids such as water or milk.

An object of the present invention is therefore to produce an oat flour type pudding which is free of gum characteristics and which gives a clean break when cut with a spoon and which has a non-gummy feel and fine body and texture when eaten.

Another object is to enable production of a pudding having high nutritious qualities and at the same time which can be manufactured without boiling and which will "set" without refrigeration.

A still further object is to prepare a complete oat flour pudding which has all the nutritious advantages of oat flour and which is a highly desirable food supplement and particularly a child food supplement.

A further object is to provide a composition suitable for the preparation of such a pudding.

Still further objects and advantages will appear from the more detailed description set forth below.

According to the present invention the above objects are accomplished by combining a rennet enzyme with oat flour and utilizing the resulting composition to prepare a pudding. I have found that when rennet is combined with oat flour, a pudding can be produced which surprisingly does not exhibit or develop any gumminess, which cuts sharp and clear, similar to a starch pudding, and which possesses a highly acceptable texture and body.

A pudding having these highly desirable characteristics can be simply prepared from the oat flour-rennet composition by mixing it with milk or cream, and preferably sugar, a salt to facilitate coagulation, an edible gum to eliminate any wheying off if desired, and any suitable flavor, as will herein be explained. While oat flour as such may be used to prepare the oat flour-rennet combination, it is preferable to use gelatinized oat flour.

Just what is the action of the rennet on the oat flour so that it is effective in eliminating the gumminess, and the other undesirable properties which have heretofore made oat flour unsuitable for successfully producing a pudding, is not understood. However, the desirable results obtained appear to be peculiar to the rennet enzyme in so far as it has been able to be determined. When other enzymes, such as diastatic or proteolytic enzymes are substituted for the rennet enzyme, the objectionable gumminess and other undesirable properties still are obtained. Whatever the explanation may be, the oat flour-rennet composition produces a pudding with desirable physical characteristics and free from that gumminess that is obtained where oatmeal or oat flour is used to prepare puddings in the absence of rennet.

Oat flour from any suitable source and any suitable particle size may be utilized in preparing the novel oat flour-rennet composition. The term "oat flour" is used in the generic sense to include oatmeal, finely divided oat fractions as well as oat flour. The oat flour may be prepared from oat groats, oatmeal, or rolled oats. In general, it is desirable to use oat flour produced from oat groats ground to at least about 60 to 72 mesh, and it is advantageous to gelatinize the oat groats, rolled oats or oat flour. As an example of a suitable method of gelatinizing, one part of oat groats, rolled oats or oat flour, depending on which is used as the starting material, are combined with from 3 to 6 parts of water followed by heating to at least about 160° F. to 185° F. and then drying as by vacuum or atmospheric drum drying to obtain the gelatinized oat cereal. The dried product is then finely divided to at least about 50 mesh and desirably to 70 mesh or more. Where desired, the oat groats may be ground to separate the coarse fraction and the fine fraction as described in my Patent No. 2,355,028. Both the fine and the coarse fraction in finely divided form, preferably gelatinized, may serve as the oat flour in preparing the novel rennet-oat flour composition.

The rennet-oat flour combination is made by admixing the oat flour desirably with powdered rennet using a sufficient amount of rennet to coagulate the milk used in conjunction with preparing the pudding. Any suitable salt, preferably calcium chloride, may be included to assist in the coagulation action of the rennet. Sugar to sweeten, table salt or sodium chloride to taste, any desired flavoring and coloring may also be added.

The rennet-oat flour composition is added to the milk while the milk is at a temperature of about 90° F. to 125° F. and preferably at a temperature of about 100° F. to 115° F., and stirred in the milk for a short period of time, not exceeding 1½ to 2 minutes and preferably not more than 1 minute. The combination is then allowed to stand at room temperature for a short period of time, for example, of about 5 to 10 minutes, following which the product where desired can be cooled to a temperature of 40° F. to 60° F. The resulting product is an oat flour pudding which possesses the herein before mentioned desirable properties, and the unusual property of being completely free from gumminess.

While the amount of oat flour in the novel composition may vary within wide limits, in general it is advantageous to use from 1 to 7 parts of the finely divided oat groats or oat flour, desirably in gelatinized condition, and preferably to use from 2 to 5 parts of the oat flour to each 7 parts of sugar. Among the sugars that may be employed are included sucrose, whether derived from cane, beet or sorghum, dextrose, corn starch, lactose, maltose, honey or other sweetening agent, brown sugar or molasses although it is preferable to use sugar in finely divided crystallized form such as ordinary brown sugar, cane sugar, beet sugar or dextrose.

Preferably the powdered rennet is first combined with the gelatinized oat flour using from 300 to 3000 parts of the oat flour and preferably from 500 to 1500 parts of the oat flour to each part of rennet. (Where the rennet has a strength of about 1:6500 in relating its strength to the coagulation of milk by weight.)

The oat flour-rennet combination is also preferably combined with the salt facilitating coagulation of the milk, for example, using from 40 to 2000 parts and preferably from 200 to 600 parts of the oat flour-rennet combination to each part of calcium chloride.

In preparing the pudding, between 1 and 4 parts of the oat flour-rennet-sugar combination and preferably of the oat flour-rennet-calcium chloride-sugar combination are then combined with each 10 parts of the liquid whole milk, that is with milk of approximately 35% butterfat and approximately 9% milk solids not fat content. In addition to liquid whole milk as indicated above there may also be used liquid skim milk, evaporated milk, cream and even powdered whole milk or powdered skim milk. When powdered whole milk or powdered skim milk is incorporated in the rennet-oat flour composition it is only necessary to add the resulting product to water to produce the pudding. In this case, the amount of water used is such that the total solids in the reconstituted milk are present on the same basis as in liquid whole milk. For example, where powdered skim milk or powdered whole milk is employed in admixture with the rennet-oat flour composition, then the powdered skim milk or the powdered whole milk would be combined therewith on the basis of 1 part of the powdered milk to each 13 to 8 parts of water added for preparing the pudding. In those cases where powdered skim or powdered whole milk is employed, it is advantageous to increase the amount of calcium chloride to about double of what would be required for liquid whole milk.

As examples of suitable flavorings that may be added are chocolate, cocoa, butterscotch, maple and other flavors, either natural or imitation, and salt may be used to taste. Among the other flavors that may be utilized are vanillin, coumarin, monosodium glutamate and such other products as aldehydes, lactones, ethyl butyrate, diacetyl, lauric derivatives, lime or lemon or other essential oils, foenugreek and other extractives, organic acids, ethyl acetate and other synthetic esters, etc.

In preparing the novel composition, the gelatinized oat flour may be combined directly with the rennet and intimately mixed and the composition packaged and sold as such, or the other ingredients may also be added in dry powdered form such as, for example, calcium chloride, sugar, flavoring material and with or without powdered skim milk, depending upon whether liquid milk or powdered milk is being used for the finished pudding. The resulting composition may be packaged and sold as a dry product. In the case where powdered skim or whole milk is present, it is only necessary to add the mixture to water to prepare the pudding; or to whole milk, evaporated milk or cream where powdered milk is not present in the dry mixture.

The following examples are illustrative of my invention.

*Example I*

A powdered mixture was prepared combining the following ingredients:

| | | |
|---|---|---|
| Gelatinized oat flour | grams | 10 |
| Brown sugar | do | 25 |
| Salt (sodium chloride) | do | 0.75 |
| Rennet | do | 0.01 |
| Calcium chloride | do | 0.025 |
| Butterscotch flavor | drops | 1 |
| Color—artificial | | To suit |

The above materials were intimately combined and the entire quantity was added to 8 ounces of liquid whole milk while the milk was at a temperature of 110° F. The dry ingredients were mixed into the liquid milk and the mixing was continued for 45 seconds after which the combination was allowed to stand at room temperature for 10 minutes.

At the close of that time the product had "set" and was cooled as by placing it in the refrigerator at normal refrigeration temperature of about 50° F. The product when eaten cut clean with a spoon and showed no gummy effect and none of the usual objectionable body and texture characteristics obtained where oat flour is used under any other conditions.

*Example II*

A combination of the following ingredients was prepared:

| | Grams |
|---|---|
| Brown sugar | 25 |
| Gelatinized oat flour | 13 |
| Salt (sodium chloride) | 0.75 |
| Rennet | 0.015 |
| Calcium chloride | 0.05 |
| Cocoa | 6.5 |
| Powdered skim milk | 22 |

The above ingredients were thoroughly mixed and added to 8 ounces of water at 110° F. (Repeat the procedure as in Example I above.) The resultant product was free of gummy characteristics and had a fine body and texture.

It has also been found highly desirable to incorporate with the oat flour-rennet combination a small amount of an edible gum, preferably gum karaya, and less preferably other gums such as locust bean gum, Irish moss, gum tragacanth, gelatin, agar, psyllium seed, etc. The amount of gum karaya or other gum to be employed may vary between 1 part of the gum karaya to each 5 to 15 parts of the gelatinized oat flour.

The advantage of the gum is to decrease the wheying off after the first or more spoonfuls of the pudding have been removed and the pudding then allowed to stand. Although the amount of wheying off obtained by removal of the first or more spoonfuls from the pudding dish is rather negligible, nevertheless this amount of gum will tend to overcome any wheying off which might otherwise occur.

The puddings obtained according to my invention have not only the advantage of being free of gumminess, but also they can be made as complete puddings which require only the addition of milk or water and which can be manufactured, for example, in the tropics, such as the South Pacific without requiring boiling operations and also without requiring refrigeration as the puddings may be eaten in their warm condition; they will set promptly even while warm and they do not have to be boiled after they are manufactured. Also the oat flour pudding of the present invention also has the real advantage of being an excellent food and particularly an excellent child food.

Where oatmeal, oat flour, or gelatinized oat flour is used in any other manner without rennet such as is the usual manner of preparing puddings by boiling, the gummy characteristic develops which is highly objectionable. Where the oatmeal is combined with milk or water in the absence of the rennet, the product has none of the characteristics of my novel pudding and where sufficient oatmeal is used the gummy characteristic is obtained and presents most objectionable eating qualities. On the other hand, by combining the finely divided gelatinized oatmeal and the rennet according to my invention a smooth, jelly-like pudding is obtained.

The rennet of the present invention is generally obtained by segregation from the extracts from the glands of the mammal and particularly of the young mammal. Certain plant extracts which contain chymase may also be utilized for the production of rennet or rennin although the usual source is from the inner lining of the fourth stomach of young calves and lambs.

The rennin employed may also contain a minor amount of pepsin. The pH of the final combination which results in the pudding should be held under about pH 7.0 and the desirable range of pH is between 5.5 and 7.0.

In addition to calcium chloride as the coagulating assisting salt, other salts may be used, such as potassium chloride, magnesium chloride, calcium acetate and calcium lactate but they are not as effective. Where the calcium chloride is not added with the powdered mixture, it may be added directly to the milk using about 1 to 40 parts and preferably 1 to 5 parts of the calcium chloride to each 10,000 parts of the milk. The milk used should be neutral or slightly acid in reaction, at pH 5.5 to 7.0 or preferably pH 6.0 to 6.4.

I have also found that the coagulation effect of rennet upon the milk is materially hastened by the oat flour and the milk that is used should preferably not have been heated to above 150° F. in order to obtain the best effect for the purposes of the present invention. The temperature at which the oat flour rennet combination is combined with the milk is preferably around 110° F. and may vary between 75° F. and 120° F.

Where powdered milk is employed, spray dried milk should preferably be used rather than drum dried milk.

It is to be understood that the herein detailed description is given by way of illustration and explanation only and not by way of limitation since various changes therein may be made by those skilled in the art without departing from the scope and spirit of the present invention.

Having described my invention, what I claim is:

1. A composition useful for preparing a pudding comprising an oat flour and rennet.
2. A composition useful for preparing a pudding comprising gelatinized oat flour and rennet.
3. A composition useful for preparing a pudding comprising a finely divided oat product, rennet and a sugar.
4. A composition useful for preparing a pudding comprising a finely divided gelatinized oat flour, rennet and a sugar.
5. A composition useful for preparing a pudding comprising an oat flour, rennet, calcium chloride, and a sugar.
6. A composition useful for preparing a pudding comprising an oat flour, rennet, calcium chloride, a sugar, and dried milk.
7. A composition useful for preparing a pudding comprising an oat flour, rennet, calcium chloride, a sugar, and an edible gum.
8. A composition suitable for preparing a pudding comprising an oat flour, rennet and dried milk.
9. A composition useful for preparing a pudding comprising an oat flour and rennet in the proportion of between 1 part of rennet to each 300 to 3000 parts of oat flour.
10. A pudding comprising oat flour, rennet and milk, said pudding being free of gumminess and exhibiting a sharp breaking.
11. A pudding comprising an oat flour, rennet, sugar, calcium chloride and milk, said pudding being free of gumminess and exhibiting a sharp breaking.
12. A pudding comprising an oat flour, rennet, sugar, calcium chloride, milk and an edible gum, said pudding being free of gumminess and exhibiting a sharp breaking.
13. A method of preparing a base composition useful in the production of an oat pudding which is free of gum characteristics and which exhibits sharp breaking and desirable body and texture characteristics which comprises combining an oat flour and rennet.
14. A method of preparing a base composition useful in the production of an oat pudding which is free of gum characteristics and which exhibits sharp breaking and desirable body and texture characteristics which comprises combining an oat flour, rennet and sugar.
15. A method of preparing a base composition useful in the production of an oat pudding which is free of gum characteristics and which exhibits sharp breaking and desirable body and texture characteristics which comprises combining an oat flour, rennet, sugar and calcium chloride.

16. A method of preparing a base composition useful in the production of an oat pudding which is free of gum characteristics and which exhibits sharp breaking and desirable body and texture characteristics which comprises combining an oat flour, rennet, sugar, calcium chloride and an edible gum.

17. A method of preparing a base composition useful in the production of an oat pudding which is free of gum characteristics and which exhibits sharp breaking and desirable body and texture characteristics which comprises combining an oat flour, rennet, calcium chloride and a sugar in an amount of 1 part of rennet to between 300 to 3000 parts of oat flour; 1 part of calcium chloride to each 40 to 2000 parts of the oat flour-rennet mixture, and 1 to 7 parts of the oat flour to each 7 parts of the sugar.

18. A method of preparing a pudding which comprises combining oat flour, rennet, a sugar and milk.

19. A method of preparing a pudding which comprises combining with liquid whole milk, an oat flour, rennet, a sugar and a calcium salt at a temperature of about 90° to about 125° F. and permitting the resulting product to set.

20. A method of preparing a pudding which comprises combining with water, an oat flour, rennet, a sugar, calcium chloride, and dried milk at a temperature of about 110° F. and permitting the resulting product to set.

SIDNEY MUSHER.

REFERENCES CITED

The following references are of record in the file of this patent:

UNITED STATES PATENTS

| Number | Name | Date |
| --- | --- | --- |
| 1,592,777 | Monrad | July 13, 1926 |
| 1,902,415 | Monrad | Mar. 21, 1933 |
| 2,257,599 | Frischmuth et al. | Sept. 30, 1941 |
| 2,314,459 | Salzburg | Mar. 23, 1943 |